(12) United States Patent
Geilenkirchen et al.

(10) Patent No.: US 6,671,922 B1
(45) Date of Patent: Jan. 6, 2004

(54) WIPER BLADE

(75) Inventors: Robert Geilenkirchen, Fleron (BE); Hubert Verelst, Tienen (BE); Dirk De Coninck, Londerzeel (BE); Paul Wynen, Hamont (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,851

(22) PCT Filed: Jan. 14, 1999

(86) PCT No.: PCT/DE99/00060

§ 371 (c)(1),
(2), (4) Date: Nov. 27, 2000

(87) PCT Pub. No.: WO99/39948

PCT Pub. Date: Aug. 12, 1999

(30) Foreign Application Priority Data

Feb. 9, 1998  (DE) .......................................... 198 05 026

(51) Int. Cl.⁷ .................................................. B60S 1/38
(52) U.S. Cl. ....................... 15/250.48; 15/245; 428/492
(58) Field of Search ....................... 15/250.48, 250.361, 15/245; 428/492; 325/215

(56) References Cited

U.S. PATENT DOCUMENTS

| | | | | |
|---|---|---|---|---|
| 3,035,297 A | * | 5/1962 | Overman et al. | ......... 15/250.48 |
| 4,138,759 A | | 2/1979 | Voorhees | ...................... 15/245 |
| 4,256,683 A | * | 3/1981 | Porter | ......................... 264/157 |
| 4,616,060 A | * | 10/1986 | Killgoar, Jr. | ................. 524/574 |
| 4,622,712 A | | 11/1986 | Sugita | ...................... 15/250.48 |
| 4,638,525 A | | 1/1987 | Sugita | ...................... 15/250.48 |
| 4,669,144 A | * | 6/1987 | Yasukawa et al. | ........ 15/250.48 |
| 4,716,618 A | * | 1/1988 | Yasukawa et al. | ........ 15/250.48 |
| 6,004,659 A | * | 12/1999 | Leutsch et al. | ............. 428/212 |
| 6,077,592 A | * | 6/2000 | Azuma et al. | ........... 15/250.48 |
| 6,195,833 B1 | * | 3/2001 | Geilenkirchen et al. | . 15/250.48 |

FOREIGN PATENT DOCUMENTS

| | | | | |
|---|---|---|---|---|
| DE | 35 27 093 C2 | | 12/1989 | |
| DE | 3904152 | * | 8/1990 | .............. 15/250.48 |
| DE | 196 15 421 A | | 10/1997 | |
| JP | 61-105257 | * | 5/1986 | .............. 15/250.48 |
| JP | 62-279155 | * | 12/1987 | .............. 15/250.48 |

OTHER PUBLICATIONS

Roemmp Chemie Lexikon, 9. Auflage, p. 1668.

* cited by examiner

*Primary Examiner*—Gary K. Graham
(74) *Attorney, Agent, or Firm*—Michael J. Striker

(57) ABSTRACT

A wiper blade is proposed, which has a head piece made of a diene-type rubber and a flexing piece and wedge made of chloroprene rubber.

8 Claims, 2 Drawing Sheets

WIPER BLADE

BACKGROUND OF THE INVENTION

The invention relates to a wiper blade made of rubber.

Complex demands are placed on wiper blade materials with regard to mechanical properties and also the resistance to external influences: wiper blade materials must be flexible, slide easily over the windshield, and be resistant to external influences, in particular oxidation (ozone cleavage), mineral oil, and chemicals that are contained, for example, in wiper fluid.

As a rule, wiper blade materials are rubbers, i.e. vulcanized natural and/or synthetic rubbers (see Römmp Chemie Lexikon $9^{th}$ edition, p.1668).

In order to improve the sliding properties of rubbers as wiper blade materials, the proposal has been made, for example, to coat the wiper surface, chlorinate it, or apply sliding powder to it such as molybdenum sulfide.

The wiper rubber according to DE-C-35 27 093 is comprised predominantly of EPDM, i.e. of ethylene-propylenediene-terpolymer. In EPDM, the unsaturated sites are disposed outside the main polymer chain and therefore EPDM cannot be halogenated. In addition, EPDM is not resistant to mineral oil and chemicals from the wiper fluid. In order to improve the sliding properties and the resistance of the wiper blade comprised predominantly of EPDM, therefore, according to DE-C-35 27 093, segments of chlorinated diene-type rubber are deposited on a matrix of EPDM, at least in the regions that slide on the surface of the windshield during proper use. The wiper blade has the disadvantage of a relatively complex construction of layers of different rubber materials.

SUMMARY

Accordingly, it is object of present invention to provide a wiper blade which avoids the disadvantages of the prior art.

In keeping with these objects, one feature of present invention resides, briefly stated, in a wiper blade, in which the head piece is essentially made of a diene-type rubber and the flexing piece and wedge are essentially made of chloroprene rubber.

The wiper blade with these features of the main claim has the advantage over the prior art that a favorable wiping quality is achieved with a simple design.

The head piece made of a diene-type rubber can be halogenated, which produces favorable sliding properties and smooth running in the regions in which the wiper blade cooperates with the bracket claws and the spring strip of the metallic retainer and also produces a harder surface.

For the flexing piece and the wedge of the wiper blade, chloroprene rubber is used according to the invention, which will be referred to below by the internationally standard abbreviation CR. As a result, a favorable wiper quality is achieved in a simple and inexpensive manner.

CR combines favorable mechanical properties with high resistance to the influences of weather, aging, chemicals, and temperature.

Mechanical properties of CR that are important for its use as a wiper blade material include favorable elastic properties, lowest compression set in the temperature range from −10° C. to 120° C., i.e. in the relevant temperature range for use as a wiper blade, as well as very favorable wear resistance which is only achieved otherwise through the use of expensive synthetic specialized rubber types.

In addition to the favorable mechanical properties, it has a high resistance to external influences: high weather resistance and resistance to ozone cleavage, which in contrast to other rubber types, can still be improved significantly through the addition of antioxidants and ozone inhibitors, low swelling, and high resistance to chemicals that are contained, for example, in wiper fluid, significantly higher resistance to mineral oil in comparison to vulcanizates based on natural rubber, as well as excellent temperature resistance which exceeds that of conventional vulcanized rubbers e.g. based on natural rubber, butadiene rubber, or styrene-butadiene rubber. The long-term temperature resistance of CR is approx. 80° C.

CR thus has a combination of properties which are important for the use as a wiper blade material, at a significantly lower price in comparison to specialized rubber types.

Advantageously, the region of the head piece that adjoins the flexing piece is made of the same rubber material as the wedge and the flexing piece, i.e. is made of CR. This achieves a better anchoring of the parts made of CR—flexing piece and wedge—in the head piece which is comprised essentially of the diene-type rubber.

The diene rubber of the head piece is advantageously halogenated, preferably chlorinated. This improves the surface hardness and the sliding ability in relation to the metallic retaining elements such as claw brackets and spring strips.

The rubber material for the head piece is essentially a diene rubber, wherein preferably inexpensive, commercially available rubber types are used, for example natural rubber and/or butadiene rubber and/or styrene-butadiene rubber.

BRIEF DESCRIPTION OF THE DRAWINGS

The invention will be explained in detail below in conjunction with two exemplary embodiments which are shown in the accompanying drawings.

DESCRIPTION OF PREFERRED EMBODIMENTS

Figure 1:
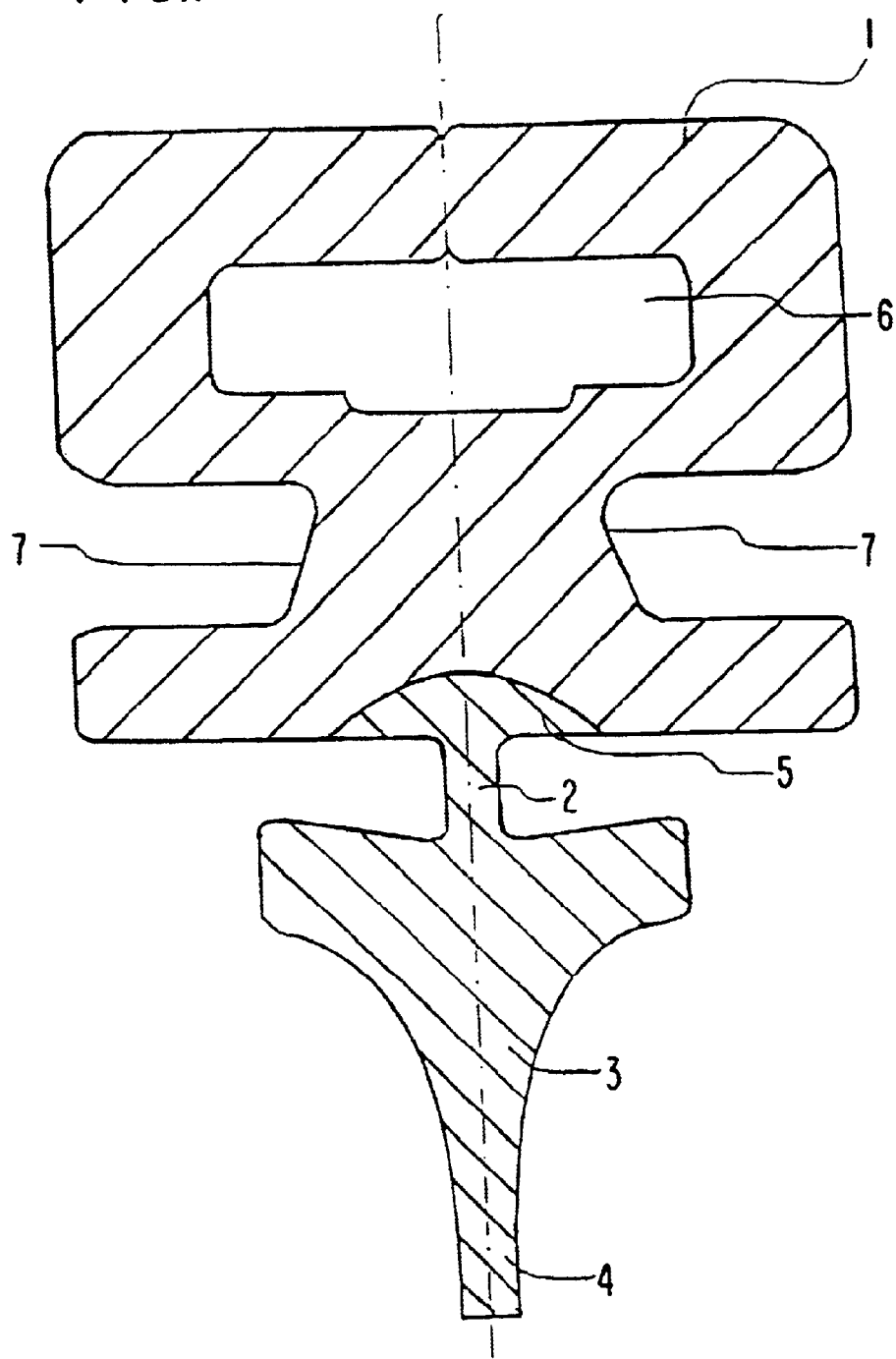
FIG. 1 shows a cross section through a wiper blade according to the invention, with an internal spring strip and FIG. 2 should cross section through a wiper blade according to the invention, with an external spring strip.

The wiper blade according to the first exemplary embodiment (FIG. 1) has the conventional, essentially strip-shaped embodiment. The cross section depicted in FIG. 1 shows a wider head piece 1 which is connected to a wedge 3 by way of a flexing piece 2. The head piece 1 has an internal conduit-shaped recess 6 for receiving the spring strip, not shown, as well as lateral recesses 7 for receiving the claws, not shown, of the metallic retaining bracket. By means of a narrow flexing piece 2, the head piece 1 is connected to the wedge 3, which tapers to a narrow wiper lip 4 on its end remote from the head piece. The head piece 1 is essentially comprised of a diene-type rubber and the flexing piece 2 and wedge 3 are, comprised of chloroprene rubber (CR). For improved anchoring of the flexing piece 2 in the head piece 1, the region of the head piece 1 adjacent to the flexing piece 2 is also made of CR.

The wiper blade according to the invention is preferably produced by means of coextrusion of diene rubber and chloroprene rubber, wherein first an unvulcanized strip with a predetermined cross-sectional form is produced. The wiper blade is then vulcanized and if need be chlorinated, for example by being treated with hypochlorite or trichloroisocyanuric acid.

Figure 2:
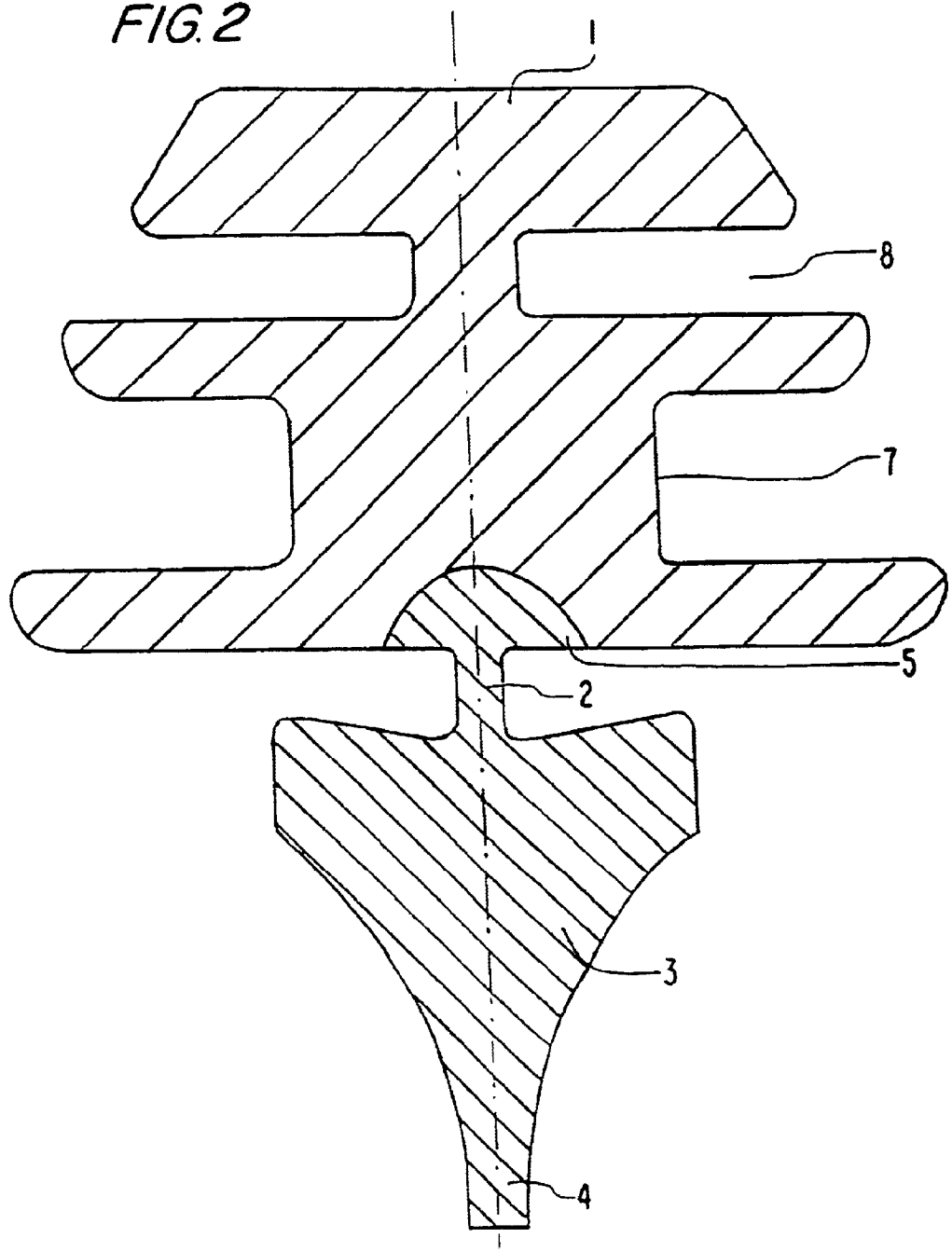

The wiper blade according to the second exemplary embodiment (FIG. 2) is designed to accommodate external spring strips. In lieu of the conduit 6 from the first exemplary embodiment, it has external recesses 8 in the vicinity of the head piece 1 in order to receive the spring strip, not shown.

What is claimed is:

1. A wiper blade composed of rubber, comprising a head piece; a flexible piece; a wedge coupled with said head piece via said flexing piece, said head piece being essentially made of a diene rubber, while said flexing piece and said wedge consisting exclusively of a same chloroprene rubber, wherein said head piece is composed of a diene rubber selected from the group consisting of natural rubber, butadiene rubber, and styrene-butadiene rubber.

2. A wiper blade as defined in claim 1, wherein in a region in which said head piece joins said flexing piece, said head piece is composed of chloroprene rubber.

3. A wiper blade as defined in claim 1, wherein said head piece is composed of a halongenated diene rubber.

4. A wiper blade as defined in claim 1, wherein said head piece is composed of a chlorinated diene rubber.

5. A wiper blade composed of rubber, comprising a head piece; flexing piece; a wedge coupled with said head piece via said flexing piece, said flexing piece consisting exclusively of chloroprene rubber, wherein said head piece is composed of a diene rubber selected from the group consisting of natural rubber, butadiene rubber, and styrene-butadiene rubber.

6. A wiper blade as defined in claim 5, wherein a region in which said head piece joins said flexing piece, said head piece is composed of chloroprene rubber.

7. A wiper blade as defined in claim 5, wherein said head piece is composed of a halongated diene rubber.

8. A wiper blade as defined in claim 5, wherein said head piece is composed of a chlorinated diene rubber.

* * * * *